ELECTRICAL CONNECTOR CLIP DEVICE

Original Filed Dec. 29, 1967 2 Sheets-Sheet 1

INVENTORS
JOHN T. VENALECK
BY ROBERT J. GABOR
Teare, Teare & Sammon
ATTORNEYS

ELECTRICAL CONNECTOR CLIP DEVICE

Original Filed Dec. 29, 1967 2 Sheets-Sheet 2

INVENTORS
JOHN T. VENALECK
BY ROBERT J. GABOR
Teare, Teare & Sammon
ATTORNEYS

United States Patent Office

Re. 28,064
Reissued July 2, 1974

28,064

ELECTRICAL CONNECTOR CLIP DEVICE

John T. Venaleck, 6273 Melshore Drive, and Robert J. Gabor, 6281 Melshore Drive, both of Mentor, Ohio 44060

Original No. 3,506,949, dated Apr. 14, 1970, Ser. No. 694,694, Dec. 29, 1967. Application for reissue Apr. 13, 1972, Ser. No. 243,589

Int. Cl. H01r *11/22, 23/10*

U.S. Cl. 339—174 21 Claims

Matter enclosed in heavy brackets [ ] appears in the original patent but forms no part of this reissue specification; matter printed in italics indicates the additions made by reissue.

ABSTRACT OF THE DISCLOSURE

An electrical connector clip device including a pair of finger members having opposed clamping jaws mounted for movement with respect to one another. A plurality of conductor elements carried by each of the finger members to electrically engage an electrical component at one end and/or to electrically engage an electrical test unit at the other end, and a resilient element coacting between the finger members for resiliently urging the same toward one another.

Background of the invention

This invention relates to electrical connectors, and more particularly relates to an electrical connector clip device for application with multiple terminal electrical and/or electronic components for use with test equipment. The present invention has particular though not exclusive application for interconnection with the input/output leads of an electrical component, such as an integrated circuit for the purpose of attaching test equipment to the leads in the dual-in-line package having multiple, such as 14 or 16, leads. However, the invention lends itself for use with any number and/or arrangement of leads in any electrical and/or electronic package.

Heretofore, the testing of various types of electrical equipment which include multiple contacts or terminals has not been entirely satisfactory. In certain equipment, such as integrated circuits, there are generally a great number of contacts or terminals closely spaced with respect to one another. In the testing of such circuits it is desirable to temporarily connect or hook a test probe of the test equipment to one or more of the terminals in a quick and positive manner. As the adjacent contacts are very closely spaced together, it has been found to be extremely difficult to connect a test probe to a single contact without simultaneously engaging an adjacent contact. Furthermore, such close spacing, although sufficient to admit some test probes, greatly increases the probability of electrically contacting adjacent terminals accidentally which could result in a short circuit or have other detrimental effects on the integrated circuit. For example, heretofore, a technician has been required to hold a test probe in one hand for testing the terminal of an integrated circuit while adjusting the test instrument with the other hand. Periodically, the technician must turn his attention away from the integrated circuit device and maintain the contact of the test probe on the terminal surface by feel, giving rise to probability of the test probe slipping from the intended contact thereby jeopardizing the integrated circuit because of faulty electrical contact with the adjacent terminals or contacts.

Summary of the invention

The present invention is an electrical connector clip device for interconnection with an electrical component and a piece of testing equipment and comprising a pair of oppositely disposed finger members having opposed clamping jaws at one end mounted for pivotal movement toward and away from one another, a plurality of conductor elements carried by and extending lengthwise of each of the finger memebrs for connection at their opposed ends to the terminals or contacts of the component and to the piece of test equipment, and resilient means disposed in coacting engaegment between the finger members for resiliently urging the same toward one another at the ends adjacent said jaws.

This invention provides an improved construction for a connector clip device which is of simple, yet rugged construction to make quick and facile electrical interconnection between the test equipment and the component to be tested. This is a device which provides for the removal of the technician's hand from the test probe during connection of test apparatus to the circuit contacts where such connection is impossible or dangerous without the device; which electrically isolates contacts at the integrated circuit; which substantially reduces the chance of accidentally electrically connecting to two or more contacts simultaneously, thus preventing short circuits or the like; which maintains proper orientation between the conductor elements and the terminals or contacts between the separate parts; which provides positive and accurate making and breaking of electrical connections with a wiping contact action and with minimum time and effort; and which provides for precise clamping engagement with positive manual control.

Description of the preferred embodiments

Figure 1:
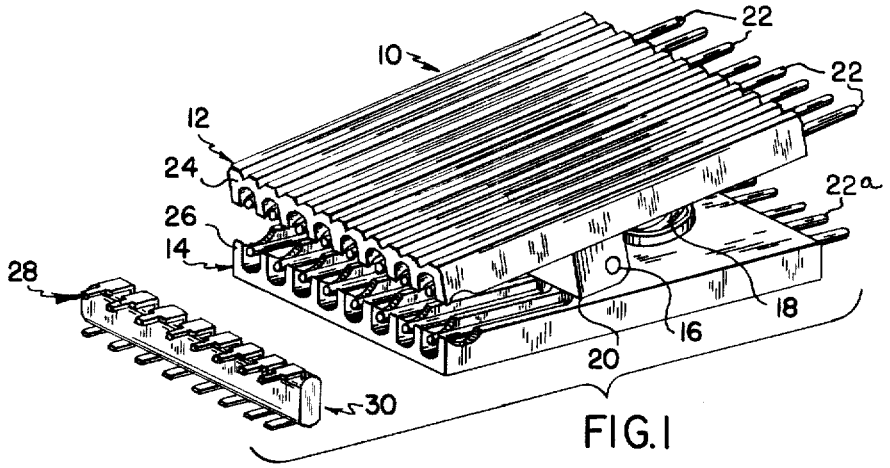
FIG. 1 is a perspective view of the connector clip device of the present invention shown for use with a typical electrical component.

The novel test clip device of the present invention is illustrated in perspective generally at 10 in FIG. 1, and as shown, includes a pair of finger members 12 and 14, which are pivotally connected to one another, such as at 16. The clip 10 may be provided with a pair of jaws 24 and 26 adjacent one end thereof, and a resilient means 18 to urge the jaws 24 and 26 toward one another. Preferably, an abutment means 20 may be provided to limit the pivotal movement of the fingers 12 and 14 toward one another to maintain the jaws 24 and 26 in a predetermined angular relation with respect to one another when the clip 10 is in the non-used condition. By forcing the ends of the fingers 12 and 14 remote from the jaws 24 and 26 together against the force of the resilient means 18, the jaws 24 and 26 are made to move apart from one another permitting the insertion of a component 30 therebetween or, the placement of the device onto the component 30 if the component is mounted on a circuit board or the like. Upon removal of the force, the jaws 24 and 26 are urged together by the resilient means 18, thereby clamping the component 30 securely between the jaws 24 and 26. Preferably, a plurality of conducting elements 22 extend longitudinally of the fingers 12 and 14 with one end of the elements 22 adapted to engage the respective input/output leads 28 of a component 30 for use with electrical systems, such as an integrated circuit board (FIG. 7) or the like, when the jaws 24 and 26 are clamped thereabout. The opposite ends of the conducting elements 22 preferably project outwardly from the opposite end of the finger members 12 and 14 to provide exposed terminals which may be connected to the leads of various testing equipment or the like.

Each of the finger members 12 and 14 is preferably identical in configuration, therefore, only one finger member, such as 12 (FIG. 2), will be described in detail with all like parts and features on the other finger 14 being designated and referred to by a like numeral with the suffix "a" added thereto.

Figure 2:
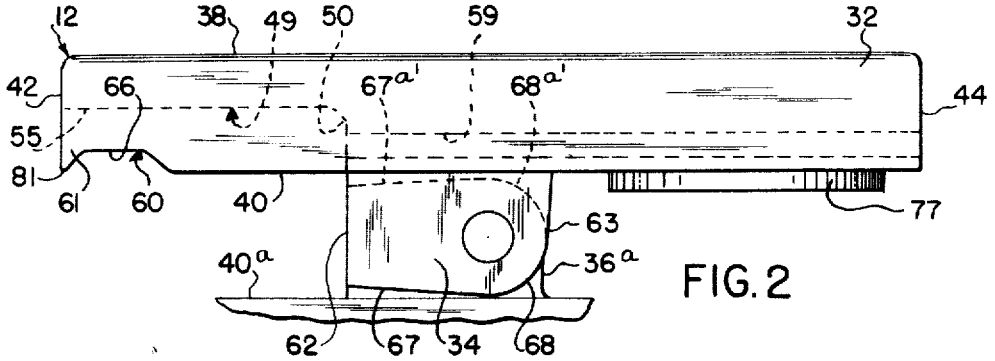
FIG. 2 is an enlarged fragmentary side elevation view of the device of the present invention with the finger members disposed generally parallel to one another, but with conductor elements removed.
Figure 3:
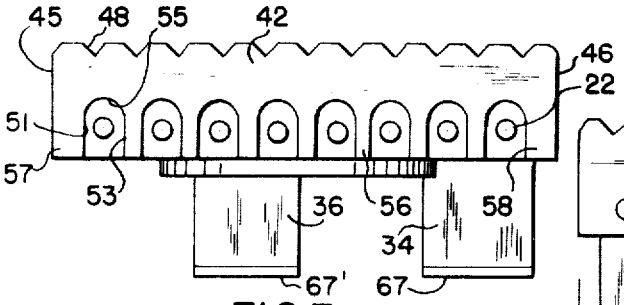
FIG. 3 is an end view of one of the identical finger members.
Figure 4:
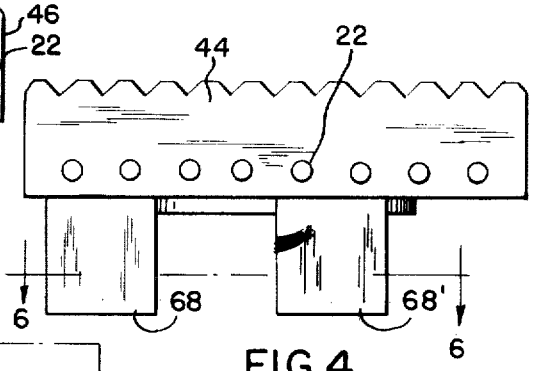
FIG. 4 is an end view opposite to that shown in FIG. 3.
Figure 5:
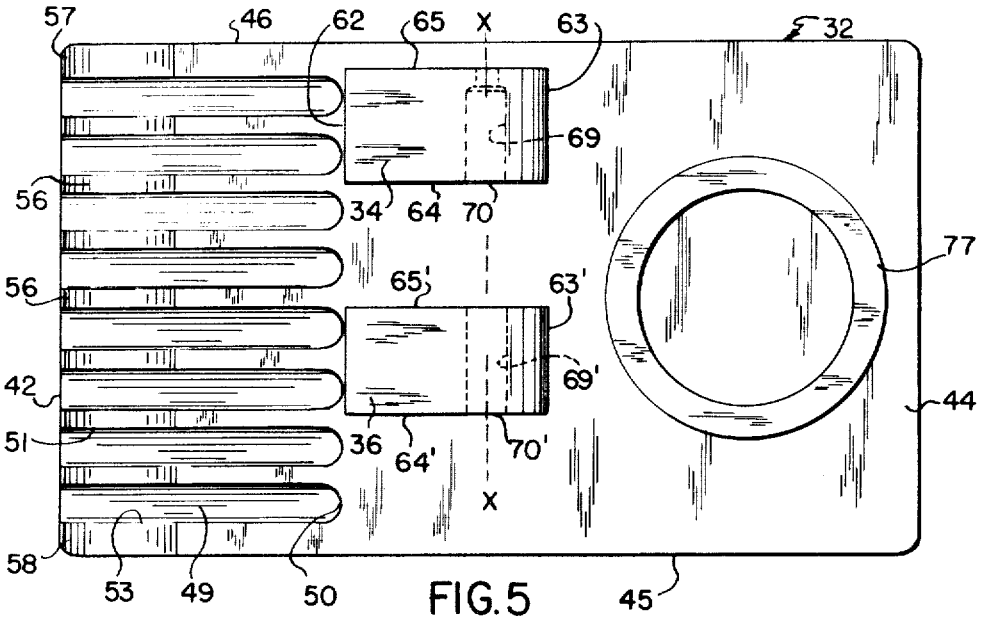
FIG. 5 is an elevation view showing the under surface of the device of FIGS. 3 and 4, but with conductor elements removed.

Referring now to FIGS. 2, 3, 4 and 5, the finger member 12 comprises an elongated body 32 and a pair of leg members 34 and 36 which project outwardly therefrom. The body 32 may be made of any good electrical insulating material, as for instance a polymeric material, such as nylon or Delrin (trademark) which is an acetal resin, or the like, and may include an outer surface 38, an inner surface 40, a front surface 42, a rear surface 44, and side surfaces 45 and 46 (FIGS. 2 and 3). Preferably, the front 42, rear 44 and side 45 and 46 surfaces are generally perpendicular to each other with each being generally perpendicular to the inner and outer surfaces 40 and 38, respectively, to define a generally rectangular configuration, as shown in FIG. 5. The lengthwise dimension between front surface 42 and the rear surface 44 may be greater than the widthwise dimension between the side surfaces 45 and 46 with both the length and width being substantially greater than the thickness between the outer surface 38 and the inner surface 40, to give the body 12 a generally flat and elongated appearance, as illustrated in FIG. 1. The upper surface 38 may be provided with a plurality of grooves 48 which are preferably equally spaced and V-shaped in configuration (FIGS. 3 and 4), and which may extend lengthwise along the surface 38 terminating on opposite sides of the body 12 by opening onto the front and rear surfaces 42 and 44, respectively. This arrangement provides an effective gripping contact when handling the clip 10

The inner surface 40 is generally planar over a major portion of its length and may include a plurality of elongated channels 49 (FIG. 5) disposed adjacent one end thereof. Preferably, the channels 49 extend lengthwise inwardly from the front surface 42 and terminate in an end wall 50 (FIG. 2) which is preferably generally perpendicular to the inner surface 40. The channels 49 may be of any suitable configuration, but are preferably uniform in cross section, having a generally U-shaped configuration, as seen in end elevation of FIG. 3. The channels 49 are defined by generally parallel side walls 51 and 53 and a generally semi-circular inner wall 55 which merges smoothly with the side walls 51 and 53. The end wall 50 may also be generally semi-circular in configuration (FIG. 5) so as to merge smoothly with the side walls 51 and 53. The channels 49 may be equally spaced widthwise across the body 32 to provide a plurality of interior dividing walls 56 therebetween and exterior walls 57 and 58 with the spacing therebetween coinciding with the spacing of the contacts on the component 30 to be tested. The exterior walls 57 and 58 may be slightly greater in thickness than the interior walls 56 to provide additional structural strength. In addition, this walled arrangement provides a barrier-like construction which separates and electrically isolates the channels 49 from one another.

For each channel there may be provided a linearly extending bore 59 (FIGS. 2 and 7) which extends lengthwise of the body 32. Preferably, the bores 59 extend generally parallel to one another and commence at the end wall 50 and extend rearwardly opening onto the rear surface 44 and are adapted to receive conductor elements 22 therein. Preferably, the bores 59 are generally circular in cross section and may have a transverse diameter adjacent the inner wall 50 slightly less than the diameter adjacent the rear surface 44 thereby facilitating the insertion of conductor elements 22 therethrough. The bores 59 extend generally parallel to the outer surface 38 and inner surface 40 and are preferably spaced inwardly of the inner surface 40 so that the conductor elements 22 will be disposed in the channels 49 in a manner so as to have their longitudinal central axes positioned generally equidistant between the side walls 51 and 53 of the respective channels 49.

The conductor elements 22 may be made of any suitable conductive material, such as Phosphor bronze, aluminum or the like, preferably having spring qualities, and may comprise linear elongated wires of uniform cross section having the same general external configuration as the bores 59. The elements 22 may be plated, such as with gold or the like, to enhance the contact effectiveness. The diameter of the wires 22 may be less than the diameter of the bore 59 at the point adjacent the rear surface 44, but preferably greater than the diameter of the bores 59 adjacent the rear wall 50 of the channels 49 to insure that the wires 22 will be held securely in place upon insertion into the bores 59. It is to be understood that conductor elements may be mounted by any of a number of methods without departing from the scope of the invention. For example, the elements may be inserted by a "press-fit" into preformed bores, such as 59, or may be molded in situ, as desired.

Figure 7:
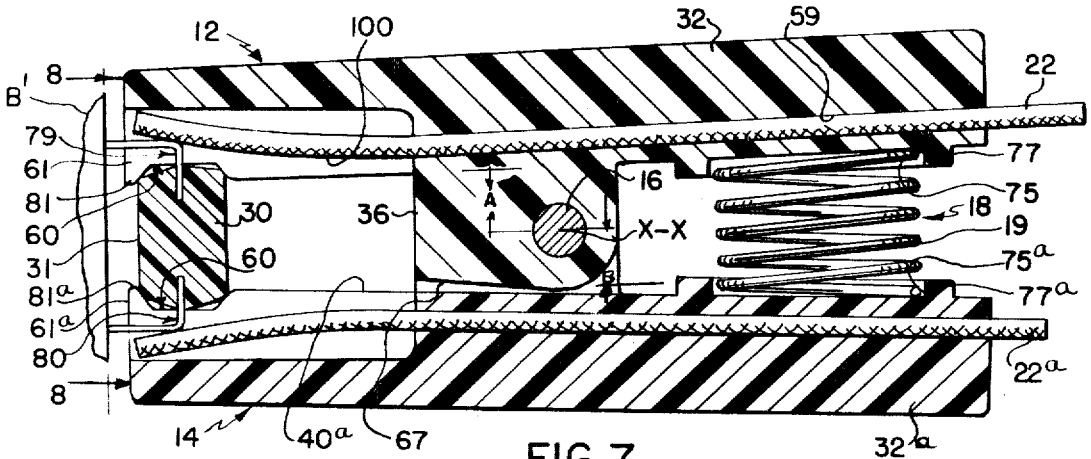
FIG. 7 is a cross-sectional side elevation view of the device of the present invention with a typical electrical component clamped therein.

As shown in FIG. 7, the wires 22 project away from the end wall 50 into the channels 49 in preferably spaced-apart relation to the inner wall 55 to provide a cantilever like spring arrangement which will be described more fully hereinafter. The stiffness of the spring effect will depend upon the axial extent of the channels 49 which is preferably about 15 times the diameter of the conductor elements 22. Preferably, the free ends of the conductor elements 22 adjacent the front surface 42 are disposed generally in a common plane which extends perpendicularly to the axes of the elements 22 and slightly inwardly of the surface 42. When not in use as in FIG. 1, the inner surfaces of the elements 22 such as 100, are disposed in a common plane which extends parallel to the axes of the elements 22 and which extend through the deepest portion, such as 66, of the recess defined by the cut-out portions 60. By this arrangement, the free ends of the conductor elements are freely mounted for resilient coacting conducting engagement with the associated leads of an electrical component to be tested upon clamping action of the jawed finger members, as will hereinafter be more fully described. The elements 22 are preferably of a length sufficient to have one end thereof disposed adjacent or slightly inwardly of the front surface 42 so as to engage the contacts 79 and 80 of the input/output leads 28, and the other end projecting outwardly beyond the rear surface 44. As the bores 59 are generally parallel to one another, the elements 22 will be evenly spaced from one another when the project outwardly beyond the rear surface 44, as shown in FIG. 4.

Wire elements 22 of finger member 12 will be seen in FIG. 7 to project outwardly beyond the rear surface 44 to a further extent than the corresponding elements 22a of finger member 14. By this arrangement, there may be provided a perpendicular connection to the elements 22 of finger member 12, thereby allowing a vertical connection with out interference with the elements 22a of finger member 14, as desired.

Each of the interior walls 56 and exterior walls 57 and 58 may include a cut-out portion 60 spaced just inwardly of the front surface 42 to provide a plurality of downwardly extending tooth-like projections 61 adjacent the front surface 42. The cut-out portions 60 may be of identical size and configuration which together define a generally continuous recess extending widthwise across the inner surface 40 of the body 32.

As aforementioned, each finger member 12 and 14 includes a pair of legs 34 and 36 which project outwardly from the inner surface 40. The legs 34 and 36 are preferably identical in configuration, and therefore, only one of the legs, such as 34, will be described in detail, whereas the corresponding parts of the other leg 36 will be given the same numerical designation with a suffix prime (′) added thereto.

The leg 34 may be generally rectangular when viewed in endwise relation (FIG. 5) and may be defined by planar front surface 62, rear surface 63, and side surfaces 64 and 65, all of which are disposed generally perpendicular with respect to one another and to the inner surface 40, with the transverse distance between the front surface 62 and rear surface 63 being greater than the transverse distance between the side surfaces 64 and 65. The leg 34 is further defined by a generally planar outer end surface 67 (FIG. 2) which is preferably slightly inclined outwardly with respect to the inner surface 40 in a direction away from the front surface 62 terminating in a rounded shoulder portion 68 which curves generally rearwardly and upwardly so as to merge smoothly with the rear surface 63. The point on a surface 67 normal to the axis x—x (FIG. 7) is the rearmost extremity of this surface and the forwardmost extremity of the rounded shoulder portion 68. The leg 34 may be provided with cylindrical opening 70 defined by an inner wall 69 extending completely through the leg and generally perpendicularly to the side surfaces 64 and 65 and being adapted to receive a connecting pin 16 therein for holding the finger members 12 and 14 together, and about which each finger member may pivot with respect to one another.

Preferably, the pin 16 should be of sufficient diameter such that the central longitudinal axis of the pin 16 will be substantially coincidental with the central longitudinal axis x—x of the opening 70. Preferably, the pin is positioned closer to the rear surface 63 than to the front surface 62. The distance A (FIG. 7) between the central longitudinal axis x—x of the opening 70 normal to the surface 40, is greater than the distance B between the axis x—x normal to the surface 67 to provide clearance between the leg 36 and the inner surface 40a of the finger member 14 (FIG. 7). By this arrangement, the rearmost extremity of the outer surface 67 (FIG. 7) of the leg 36 will be slightly spaced-apart from the surface 40a of the finger member 14 thereby permitting movement of the finger member 12 either clockwise or counterclockwise with respect to the finger member 14 without any frictional engagement between the surface 67 and the inner surface 40a. Preferably, the distance between the rearmost extremity of the surface 67 and the surface 40a is less than the length of the surface 67 such that the surface 67 will abuttingly engage the surface 40a upon pivotal movement of the finger member 12 counterclockwise about the pin 16 when viewed in sidewise relation as shown in FIG. 2.

Referring again to FIG. 5, the legs 34 and 36 are positioned such that the opening 70 and 70′ are axially aligned in widthwise direction across the surface 40 having the axis x—x generally perpendicular to the conductor element and spaced approximately equidistant between the front surface 42 and the rear surface 44. One of the legs, such as 36, of the finger member 12 may be disposed more interiorly of a side surface, such as 45, than the other leg 34 is disposed of surface 46, and preferably has a side surface 65′ is disposed parallel to the conductor elements 22 and generally equidistant between the side surfaces 45 and 46 of the body 32. The legs 34 and 36 may be spaced-apart from one another such that the transverse widthwise distance between the surfaces 65′ and 64 is approximately equal to the width of the interior leg 36, but may be slightly wider than this in order to prevent binding as the legs 34 and 36 move with respect to one another when the finger members 12 and 14 are pivoted about the pin 16. When the identical finger member 14 is inverted for installation with the finger member 12, the side surface 65a′ of the leg 36a, corresponding to the side surface 65′ of the leg 36, will be disposed generally parallel to and adjacent the side surface 65′ of the leg 36. As the interior legs 36 and 36a of the finger members 12 and 14, respectively, are of equal width, and approximately equal in width to the distance between the surfaces 64 and 65′ of the legs 34 and 36, the surface 64a′ of the finger member 14 will be disposed generally parallel to and adjacent the surface 64 of the finger member 12. By the foregoing arrangement, lateral shifting of the finger members is prevented and each of the wires 22 disposed in the body 32 will move and be maintained in the same vertical plane as the corresponding wire, such as 22a, disposed in the body 32a upon pivotal movement of the finger members 12 and 14.

Figure 6:
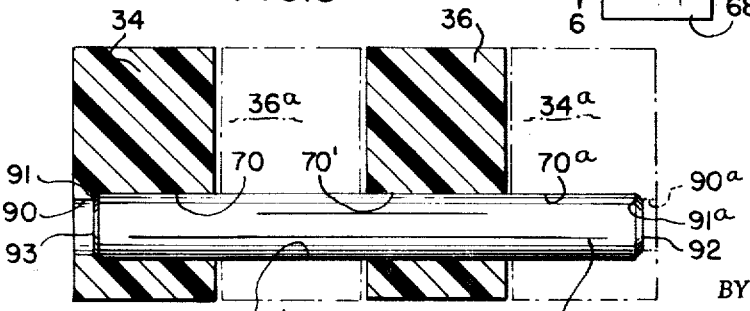
FIG. 6 is a cross-sectional view taken along the line 6—6 of FIG. 4.

As previously indicated, the finger members 12 and 14 are held together by the pin 16, which extends through the openings 70, 70′, 70a and 70a′ of the legs 34, 36, 34a and 36a, respectively, when the finger members 12 and 14 are connected together, as shown in FIG. 6, the diameter of the cylindrical opening 70 is preferably reduced adjacent the side walls 65 and 65a by openings in the resilient material of finger members 32 and 32a, such as at 90 and 90a, which have a reduced transverse dimension as compared to that of the bore 70. Preferably, the length of the pin 16 is less than the distance between the inner edge surfaces 91 and 91a. As the diameter of the pin 16 is approximately equal to the diameter of the bore 70, when one end of the pin, such as at 92, is forced into the opening 70, the opening 90 will be deformed permitting the pin to pass through the legs. When the opposite end 93 clears the inner edge surface 91, the opening 90 will snap back thereby causing the pin 16 to be retained in engagement by and between the respective openings 90 and 90a.

A resilient means 18 (FIG. 7) may be provided to urge the jaws 24 and 26 together and impart a gripping and clamping capability thereto. The resilient means 18 may be in the form of a helical spring 19 which may be disposed intermediate the inner surfaces 40 and 40a of the finger members 12 and 14, respectively. Preferably, the spring 19 is disposed adjacent the end of the bodies 32 and 32a remote from the jaws 24 and 26. The spring 19 may have its opposite ends disposed in recesses 75 and 75a formed by annular projections 77 and 77a which project outwardly away from the surfaces 40 and 40a of the bodies 32 and 32a, respectively.

As shown in FIG. 7, the spring 19 serves to urge the finger member 12 to pivot in a clockwise direction and the finger member 14 in a counterclockwise direction about the pin 16. As previously indicated, the pivotal movement of the finger member 12 will be limited when the outer surfaces 67 and 67′ of the legs 34 and 36, respectively, abuttingly engage the inner surface 40a of the finger member 14, and likewise, the corresponding outer surface 67a and 67a′ of the legs 34a and 36a, respectively, will abuttingly engage the inner surface 40 of the finger member 12 whereby the body 32 will be disposed at a predetermined angle with respect to the body 32a and the spring 19 will be maintained securely seated in the recesses 77 and **77*a***.

Figure 8:
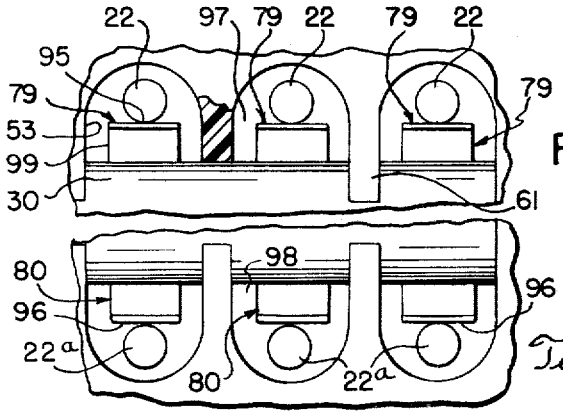
FIG. 8 is an enlarged fragmentary end view taken along the line 8—8 of FIG. 7.

Referring to FIGS. 7 and 8, when the spring 19 is fully compressed, the tips 81 and 81a of the teeth 61 and **61*a* are preferably spread apart a distance greater than the maximum transverse height of the component 30, but less than the maximum transverse distance between the opposed contact surfaces 95 and 96 of the contacts 79 and 80**, respectively, which enables the teeth 61 and 61a to be passed through the spaces 97 between the respective contacts, such as 79, and through the spaces 98 between the respective contacts 80. Such an arrangement will make it impossible to position the teeth 61 and 61a in any position other than between and adjacent of the contacts 79 and 80, as indicated. Additionally, limiting the opening of the jaws 24 and 26 will cause the wires 22 to slide over the contact surfaces 95 and 96 of the component 30 in a wiping-like manner which will enhance the contact effectiveness.

Referring again to FIG. 8, the diameter of the wires 22 for a given width of the channels 49 is preferably greater than the spacing between a side wall, such as at 53 (FIG. 8), and the nearest part of a contact 79, such as at 99, even when contact 79 is displaced furthest to the right in channel 49, to insure a positive electrical connection between the respective wires 22 and the contact surfaces 95 and 96. Furthermore, it is preferred that the distance between the contact surfaces, such as at 95, and the deepest extent of the inner wall 55 is greater than the diameter of the wire 22 whereby the wire will be spaced apart from the inner wall 55 when the clip is clamped in position on the component 30, thereby maximizing the function of the various features described herein.

When the clip is not in use, that is, in the unclamped position, the spring 19 will urge the finger members 12 and 14 apart causing them to pivot about the pin 16 until the outer surfaces 67 and 67′ of the legs 34 and 36 abut the inner edge 40*a* of the finger member 14 while the corresponding outer surfaces 67a and 67a′ of the legs 34a and 36a of the finger member 14 simultaneously abut the inner surface 40 of the finger member 12 thereby limiting the movement of the jaws 24 and 26 toward one another. When the ends of the bodies 32 and 32a remote from the jaws 24 and 26 are urged together against the force of the spring 19, the jaws 24 and 26 are spread apart permitting an electrical component of a circuit board, such as 30, to be disposed in the transversely extending recess formed by the cut-out portions 60 and 60a. As the force opposing the spring 19 is released, the jaws 24 and 26 will move toward one another clamping the component within the recesses. When the width of the component is less than that of the cut-out portions 60 and 60a, the teeth will overlap the front surface 31 of the component 30 making it difficult to pull the clip 10 away from the component unless the jaws 24 and 26 are again spread apart by depressing the spring 19. In the clamped position, the contacts 79 and 80, respectively, will be forced into the channels 49 (FIG. 8) with each of the wires 22 and 22a wipingly engaging the contact surfaces 95 and 96 of the contacts 79 and 80, respectively, with the inherent resiliency of the cantilevered conductor elements 22 and 22a providing a spring-like effect to compressibly hold the conductor elements 22 and 22a securely in engagement with the contacts 79 and 80. The interior walls 56 will serve to provide a barrier between each of the respective adjacent contacts 79 or adjacent contacts 80, which are spaced laterally of the component 30 so as to prevent lateral shifting of the clip 10 with respect to the component 30 to be tested.

The terms and expressions which have been used are used as terms of description and not of limitation and there is no intention in the use of such terms and expressions of excluding any equivalents of the features shown or described or portions thereof and it is recognized that various modifications may be possible within the scope of the invention claimed.

We claim:

1. A connector clip device for interconnection with the leads of a multiple terminal electrical and/or electronic component comprising:

a pair of oppositely disposed support members mounted for pivotal movement with respect to one another each having a body including a front end and a rear end, each of said support members carrying a plurality of laterally spaced, elongated conductor elements extending from the front end to the rear end of the respective body, said support members pivotally connected to one another between said front and rear ends with at least one of said support members including a plurality of elongated, laterally spaced channel portions disposed adjacent said front end and extending in a direction toward said rear end, one end of each of said conductor elements of at least one of said support members projecting in cantilevered relation forwardly from said body into a respective one of said channel portions and disposed for pivotal movement therein for resilient pressure engagement with a lead of said component, the other end of said conductors projecting outwardly beyond the rear end of said body for free and unobstructed access thereof, a jaw-like clamping means disposed adjacent the front ends of said support members operably associated with said conductor elements for interlocking engagement of said device with said component and resilient engagement of said cantilevered conductor elements with said leads, and resilient means coacting with said support members for resiliently urging said jaw-like clamping means toward one another for clamping engagement with said component.

2. A connector clip device in accordance with claim 1, wherein:

said jaw-like means includes a continuous recess in at least one of said support members, said recess extending transversely of said channel portions and spaced rearwardly from said front end and defining a tooth-like structure for overlapping and interlocking engagement with said component in the clamped position of said device.

3. A connector clip device in accordance with claim 1, wherein:

said conductor elements are disposed in generally parallel and equally spaced apart relation with respect to one another within said channel portions, and said channel portions open onto said adjacent front end.

4. A connector clip device in accordance with claim 1, wherein said channel portions are defined by a plurality of laterally spaced barrer-like walls adapted for electrically insulating said conductor elements from one another.

5. A connector clip device in accordance with claim 4, wherein said recess is defined by a plurality of generally aligned cut-out portions formed in said barrier-like walls.

6. A connector clip device in accordance with claim 4, wherein:

said channel portions extend along the confronting inner surface of at least one of said support members opening in a direction toward the other support member, and said conductor elements extending into said recess for conducting engagement with the leads of said component in the clamped position of said device.

7. A connector clip device in accordance with claim 6, wherein said one support member is substantially identical in configuration with said other support member.

8. A connector clip device in accordance with claim 1, wherein said support members include rib-like means on their exterior surface for gripping engagement thereof.

9. A connector clip device in accordance with claim 1, wherein said conductor elements are disposed in shaped relationship with respect to the confronting surfaces of said channel portions and adapted for resilient movement therein.

10. A connector clip device in accordance with claim 1, wherein the conductor elements carried by one of the said support members extends outwardly a greater distance as compared to the conductor elements carried by the other of said support members.

11. A connector clip device in accordance with claim 1, wherein:

the pivotal connection between said support members comprises at least one leg member extending from each of said support members, and a pivot element connecting said leg members together for pivotal movement with respect to one another.

12. A connector clip device in accordance with claim 11, wherein at least one of said leg members includes an abutment means adapted for coacting engagement with an associated one of said support members for limiting clamping movement of said jaw-like means toward one another.

13. A connector clip device in accordance with claim 11, wherein said pivot element is off-set laterally in a direction toward said resilient means.

14. A connector clip device in accordance with claim 11, wherein:

said leg members have generally aligned bores, said pivot element disposed in said bores, and the bore in one of said leg members having a deformable portion of reduced transverse dimension adapted for deformation upon insertion of said pivot element into said bore.

15. In a connector clip device for interconnection with the leads of a multiple terminal electrical and/or electronic component comprising:

a pair of oppositely disposed support members pivotally connected to one another and each having a body including a front end and a rear end, each of said support members carrying a plurality of laterally spaced, elongated conductor elements extending from the front end to the rear end of the respective body, jaw-like clamping means disposed adjacent the front ends of said support members for interlocking engagement of said device with said component, resilient means coacting with said support members for resiliently urging said jaw-like clamping means toward one another for clamping engagement with said component, said pivotal connection between said support members including at least one leg member extending from the confronting inner surface of each of said support members, a pivotal element connecting said leg members together, at least one of said leg members including an abutment means disposed for coacting engagement with the confronting inner surface of the other of said support member for limiting clamping movement of said jaw-like means toward one another.

16. A connector clip device in accordance with claim 15, wherein said abutment means comprises an abutment surface disposed adjacent the outer free end of said one leg member remote from said body.

17. A connector clip device in accordance with claim 16, wherein said abutment surface extends forwardly in a direction away from said pivotal element and disposed in inclined relation with respect to the inner surface of said body.

18. A connector clip device in accordance with claim 17, wherein said resilient means is disposed on the side of said pivotal element remote from said abutment surface adapted to urge said abutment surface into abutting engagement with the confronting inner surface of said other support member for limit movement of said jaw-like means toward one another and the rear ends of said support members apart from one another.

*19. A connector clip device for interconnection with the leads of a multiple terminal electrical and/or electronic component comprising:*

*a pair of oppositely disposed support members mounted for pivotal movement with respect to one another, each having a body including a front end and a rear end,*

*means coacting with said support members for urging the front ends of the same toward one another for clamping engagement with said component,*

*the interior front end portion of each said support member defining a confronting surface and lack of the latter being provided with a series of laterally spaced-apart recesses with intervening electrically insulative walls,*

*plural conductors carried interiorly by each said support member and projecting lengthwise therein in cantilever fashion into said recesses below said confronting surfaces for paired wiping engagement respectively with contacts of said component received in the recesses when the clip is thus clamped to the latter,*

*the width of each recess and each conductor in the same being dimensionally related to the width of the component contact in the same recess so that the maximum clearance between the component contact and either wall bounding the recess is appreciably smaller than the conductor width to assure connection between respective conductors and component contacts,*

*and means for directing the conductors to distal portions of the bodies of said support members relative to the cantilever mountings thereof for external circuit connection.*

*20. A connector clip device in accordance with claim 19 wherein lengths of the conductors extend outwardly from their respective cantilevered mounts toward the front ends of said bodies of said support members and are spaced out of engagement with the said bodies.*

*21. A connector clip device in accordance with claim 19 wherein said points of engagement of the conductors in each recess when engaged with the component contacts are transversely spaced apart a greater distance than the cantilever mountings of the conductors within the bodies of the support members, whereby said conductor lengths between the two are distorted relatively outwardly for firm engagement with the contacts.*

References Cited

The following references, cited by the Examiner, are of record in the patented file of this patent or the original patent.

UNITED STATES PATENTS

| | | | |
|---|---|---|---|
| 3,349,430 | 10/1967 | Rosenvold et al. | 16—169 |
| 3,130,351 | 4/1964 | Giel | 339—74 R X |
| 2,937,357 | 5/1960 | Kennedy | 339—176 MP X |
| 2,103,891 | 12/1937 | Brown | 339—255 P X |
| 2,295,367 | 9/1942 | Sulzer | 339—255 P X |
| 2,428,057 | 9/1947 | Wilburn | 339—255 P X |
| 2,714,711 | 8/1955 | Crane | 339—74 R |
| 2,748,437 | 6/1956 | Dold | 24—137 A |
| 2,824,464 | 2/1958 | Remington | 287—85 R X |
| 3,090,028 | 5/1963 | Hall et al. | 339—174 |
| 3,118,715 | 1/1964 | Potruch | 339—174 X |
| 3,169,816 | 2/1965 | Hammond et al. | 339—200 X |

OTHER REFERENCES

Uberbacher, "Cammed Connector," IBM Tech. Disclosure, vol. 9, No. 3, August 1966, p. 254.

FRANCIS K. ZUGEL, Primary Examiner

L. J. STAAB, Assistant Examiner

U.S. Cl. X.R.

339—17 CF, 200 P

UNITED STATES PATENT OFFICE

CERTIFICATE OF CORRECTION

PATENT NO. : Re. 28,064

DATED : July 2, 1974

INVENTOR(S) : John T. Venaleck and Robert T. Gabor

It is certified that error appears in the above-identified patent and that said Letters Patent are hereby corrected as shown below:

Column 2, line 5, "memebrs" has been changed to --members--.

Column 3, lines 39 and 44, "12" has been changed to --32--.

Column 4, line 61, "the" (first occurrence) has been changed to --they--.

Claim 4, line 2, "1" has been changed to --2--, and
line 3, "barrer-like" has been changed to --barrier-like--.

Claim 9, line 2, "shaped" has been changed to --spaced--.

Claim 10, line 2, --the other end of-- has been added after "wherein", and
line 4, --the other end of-- has been added after "to".

Claim 18, line 6, "limit" has been changed to --limiting--.

Claim 19, line 12, "lack" has been changed to --each--.

Signed and Sealed this

*Tenth* Day of *October 1978*

[SEAL]

*Attest:*

RUTH C. MASON
*Attesting Officer*

DONALD W. BANNER
*Commissioner of Patents and Trademarks*